United States Patent
Ichieda et al.

(10) Patent No.: US 11,489,726 B2
(45) Date of Patent: Nov. 1, 2022

(54) ELECTRONIC APPARATUS, METHOD OF CONTROLLING SETTING DEVICE, AND NON-TRANSITORY COMPUTER-READABLE STORAGE MEDIUM STORING PROGRAM

(71) Applicant: SEIKO EPSON CORPORATION, Tokyo (JP)

(72) Inventors: Hiroyuki Ichieda, Matsumoto (JP); Koichiro Ota, Omachi (JP); Makoto Shigemitsu, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/174,821

(22) Filed: Feb. 12, 2021

(65) Prior Publication Data

US 2021/0258207 A1 Aug. 19, 2021

(30) Foreign Application Priority Data

Feb. 13, 2020 (JP) .............................. JP2020-022152

(51) Int. Cl.
*H04L 41/084* (2022.01)
*H04B 5/00* (2006.01)

(52) U.S. Cl.
CPC ......... *H04L 41/084* (2013.01); *H04B 5/0031* (2013.01); *H04B 5/0056* (2013.01)

(58) Field of Classification Search
CPC .... H04L 41/084; H04B 5/0031; H04B 5/0056
(Continued)

(56) References Cited

U.S. PATENT DOCUMENTS 10,015,739 B2* 7/2018 Yoon .................. H04W 52/0209
10,079,616 B2* 9/2018 Reynolds ............ H04L 27/2602
(Continued)

FOREIGN PATENT DOCUMENTS

JP 2012-043081 A 3/2012
JP 2017-022443 A 1/2017
(Continued)

OTHER PUBLICATIONS

T. Ulz, T. Pieber, A. Höller, S. Haas and C. Steger, "Secured and Easy-to-Use NFC-Based Device Configuration for the Internet of Things," in IEEE Journal of Radio Frequency Identification, vol. 1, No. 1, pp. 75-84, Mar. 2017, doi: 10.1109/JRFID.2017.2745510. (Year: 2017).*

(Continued)

*Primary Examiner* — Melvin H Pollack
(74) *Attorney, Agent, or Firm* — Oliff PLC

(57) ABSTRACT

A setting device for performing a network configuration of an electronic apparatus is provided with a touch panel, a communication device, and a processing device described below. To the touch panel, there is input information in accordance with an operation by a user. The communication device communicates with a wireless communication tag which stores certification information to be used for certification when performing a network configuration of the electronic apparatus, and which is provided to the electronic apparatus. The processing device obtains certification information received by the communication device to judge whether or not the certification information obtained and certification information input to the touch panel match each other, and transmits configuration information input to the touch panel as information representing the network configuration to the wireless communication tag to make the wireless communication tag store the configuration infor- (Continued)

mation when it is judged that the both parties match each other.

8 Claims, 3 Drawing Sheets

(58) Field of Classification Search
USPC .......................................................... 709/220
See application file for complete search history.

(56) References Cited

U.S. PATENT DOCUMENTS

| | | | |
|---|---|---|---|
| 10,154,018 B2* | 12/2018 | Brandsma | H04B 5/0031 |
| 10,334,054 B2* | 6/2019 | Van Os | H04L 63/08 |
| 10,554,260 B2* | 2/2020 | Moon | H04L 67/2828 |
| 10,749,852 B2* | 8/2020 | Thomas | H04L 63/10 |
| 11,019,193 B2* | 5/2021 | Dellinger | G06F 3/04886 |
| 11,126,704 B2* | 9/2021 | Yang | G06F 21/35 |
| 11,233,696 B1* | 1/2022 | Kumar | H04L 9/3247 |
| 2012/0044060 A1 | 2/2012 | Matsubara et al. | |
| 2015/0382136 A1 | 12/2015 | Mihira et al. | |
| 2018/0098217 A1 | 4/2018 | Takeuchi et al. | |
| 2019/0104119 A1* | 4/2019 | Giorgi | H04L 9/3231 |
| 2019/0109820 A1* | 4/2019 | Clark | H04L 9/0861 |
| 2019/0236313 A1* | 8/2019 | Bush | H04L 63/0823 |
| 2019/0379535 A1* | 12/2019 | Fengler | H04L 9/0869 |
| 2020/0004937 A1* | 1/2020 | Ryu | G06F 21/44 |
| 2020/0044694 A1* | 2/2020 | Park | H04L 63/0823 |
| 2020/0117690 A1* | 4/2020 | Tran | G06F 16/90332 |
| 2020/0145501 A1* | 5/2020 | Murrell | H04L 67/141 |
| 2020/0169886 A1* | 5/2020 | Bhatt | H04W 12/08 |
| 2020/0225655 A1* | 7/2020 | Cella | G05B 23/0264 |
| 2020/0351882 A1* | 11/2020 | Furuichi | H04W 16/28 |
| 2020/0372515 A1* | 11/2020 | Lai | H04W 4/80 |
| 2021/0099878 A1* | 4/2021 | Frey | H04W 12/08 |
| 2021/0294913 A1* | 9/2021 | Mackenzie | G06Q 10/10 |

FOREIGN PATENT DOCUMENTS

| | | |
|---|---|---|
| JP | 2017-112618 A | 6/2017 |
| JP | 2018-056959 A | 4/2018 |

OTHER PUBLICATIONS

A. Matos, D. Romão and P. Trezentos, "Secure hotspot authentication through a Near Field Communication side-channel," 2012 IEEE 8th International Conference on Wireless and Mobile Computing, Networking and Communications (WiMob), 2012, pp. 807-814, doi: 10.1109/WiMOB.2012.6379169. (Year: 2012).*

Oussama Stiti, Othmen Braham, Guy Pujolle. Creation of Virtual Wi-Fi Access Point and Secured Wi-Fi Pairing, through NFC. International journal of communications, network and system sciences, 2014, 7 (6), pp. 175-180. 10.4236/ijcns.2014.76019. hal-01202044 (Year: 2014).*

J.M. León-Coca, et al., Authentication Systems Using ID Cards over NFC Links: The Spanish Experience Using DNIe, Procedia Computer Science, vol. 21, 2013, pp. 91-98, ISSN 1877-0509, https://doi.org/10.1016/j.procs.2013.09.014. (Year: 2013).*

W. Pomak and Y. Limpiyakom, "Enterprise WiFi Hotspot Authentication with Hybrid Encryption on NFC-Enabled Smartphones," 2018 8th International Conference on Electronics Information and Emergency Communication (ICEIEC), 2018, pp. 247-250, doi: 10.1109/ICEIEC.2018.8473476. (Year: 2018).*

T. Ulz, T. Pieber, C. Steger, C. Lesjak, H. Bock and R. Matischek, "Sureconfig: NFC and QR-code based hybrid approach for smart sensor configuration," 2017 IEEE International Conference on RFID (RFID), 2017, pp. 41-46, doi: 10.1109/RFID.2017.7945585. (Year: 2017).*

Jonjic, A., Grosinger, J., Herndl, R. T., Matischek, R., Hohlweg, G., & Boesch, W. (2014). A Security and NFC Enhanced Wireless Sensor Network Node. In Proc. IEEE Sensors. (Year: 2014).*

Y. Chahid, M. Benabdellah and A. Azizi, "Internet of things security," 2017 International Conference on Wireless Technologies, Embedded and Intelligent Systems (WITS), 2017, pp. 1-6, doi: 10.1109/WITS.2017.7934655. (Year: 2017).*

C. Huang and S. Huang, "RFID systems integrated OTP security authentication design," 2013 Asia-Pacific Signal and Information Processing Association Annual Summit and Conference, 2013, pp. 1-8, doi: 10.1109/APSIPA.2013.6694342. (Year: 2013).*

William Enck, Machigar Ongtang, and Patrick McDaniel. 2009. On lightweight mobile phone application certification. In Proceedings of the 16th ACM conference on Computer and communications security (CCS '09). Association for Computing Machinery, New York, NY, USA, 235-245. (Year: 2009).*

T. Phillips, T. Karygiannis and R. Kuhn, "Security standards for the RFID market," in IEEE Security & Privacy, vol. 3, No. 6, pp. 85-89, Nov.-Dec. 2005, doi: 10.1109/MSP.2005.157. (Year: 2005).*

* cited by examiner

ELECTRONIC APPARATUS, METHOD OF CONTROLLING SETTING DEVICE, AND NON-TRANSITORY COMPUTER-READABLE STORAGE MEDIUM STORING PROGRAM

The present application is based on, and claims priority from JP Application Serial Number 2020-022152, filed Feb. 13, 2020, the disclosure of which is hereby incorporated by reference herein in its entirety.

BACKGROUND

1. Technical Field

The present disclosure relates to an electronic apparatus, a setting device, a method of controlling a setting device, and a non-transitory computer-readable storage medium storing a program.

2. Related Art

In JP-A-2017-112618 (Document 1), there is disclosed a technology of setting information to be used to connect a printing apparatus to a network to the printing apparatus using a portable terminal having a near field wireless communication function such as NFC (Near Field Communication).

In the technology disclosed in Document 1, there is a problem that it is possible for an unauthorized third party to perform a network configuration.

In view of the problem described above, the present disclosure has an advantage of providing a technology of making it possible only for an authorized person to easily perform the network configuration of an electronic apparatus using wireless communication.

SUMMARY

In view of the problems described above, an electronic apparatus according to the present disclosure includes a wireless communication tag in which first certification information to be used for certification when performing a configuration used to be connected to a network is stored so as to be read by a setting device configured to perform the configuration, and which receives and stores configuration information input by a user as information representing the configuration when it is judged that second certification information input by the user to the setting device and the first certification information match each other.

In view of the problems described above, a method of controlling a setting device according to the present disclosure is a method of controlling a setting device provided with a communication device and configured to perform a configuration used to connect an electronic apparatus to a network, the method including the steps of obtaining first certification information to be used for certification when performing the configuration from a wireless communication tag provided to the electronic apparatus with the communication device, judging whether or not second certification information input by a user and the first certification information obtained match each other, and transmitting configuration information input by the user as information representing the configuration to the wireless communication tag with the communication device to make the wireless communication tag store the configuration information when it is judged that the second certification information and the first certification information match each other.

In view of the problems described above, a non-transitory computer-readable storage medium storing a program according to the present disclosure makes a computer execute processing including an acquisition process of obtaining first certification information to be used for certification when performing a configuration used to connect an electronic apparatus to a network from a wireless communication tag provided to the electronic apparatus, a judgment process of judging whether or not the first certification information obtained and second certification information input by a user to the computer match each other, and a transmission process of transmitting configuration information input to the computer as information representing the configuration to the wireless communication tag to make the wireless communication tag store the configuration information when it is judged in the judgment process that the first certification information and the second certification information match each other.

DESCRIPTION OF EXEMPLARY EMBODIMENTS

Some embodiments of the present disclosure will hereinafter be described with reference to the drawings. The embodiments described below are each provided with a variety of technically preferable limitations. However, the embodiment of the present disclosure is not limited to the aspects described below.

1. First Embodiment

Figure 1:
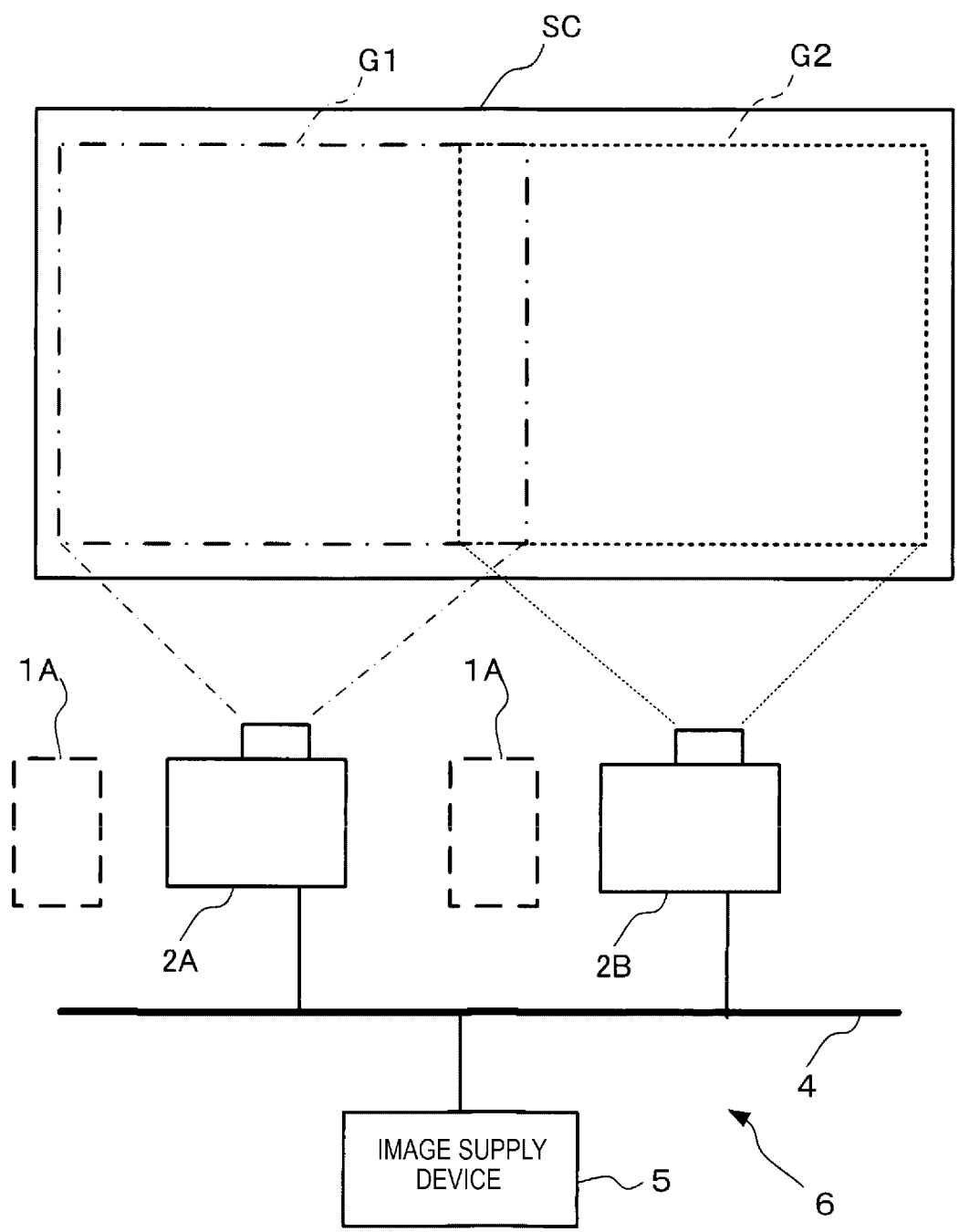
FIG. 1 is a block diagram showing a configuration example of an image display system 6 including a setting device 1A according to a first embodiment of the present disclosure, and an electronic apparatus 2A and an electronic apparatus 2B on which a network configuration is performed by the setting device 1A.

FIG. 1 is a block diagram showing a configuration example of an image display system 6 including a setting device 1A according to a first embodiment of the present disclosure, and an electronic apparatus 2A and an electronic apparatus 2B on which a network configuration is performed by the setting device 1A. The setting device 1A is, for example, a smartphone. The electronic apparatus 2A and the electronic apparatus 2B are each, for example, a projector. As shown in FIG. 1, the electronic apparatus 2A and the electronic apparatus 2B are connected to a network 4. As a specific example of the network 4, there can be cited a wired LAN (Local Area Network), a wireless LAN, Bluetooth, and so on. Bluetooth is a registered trademark. To the network 4, there is connected an image supply device 5 besides the electronic apparatus 2A and the electronic apparatus 2B. The image supply device 5 supplies the electronic apparatus 2A and the electronic apparatus 2B with image data. The setting device 1A performs a variety of types of settings on the electronic apparatus 2A and the electronic apparatus 2B so that appropriate image data is supplied to the electronic apparatus 2A and the electronic apparatus 2B, and then appropriate processing is performed on the image data thus supplied. FIG. 1 shows the fact that the variety of types of settings are performed by the setting device 1A performing a close operation on each of the electronic apparatus 2A and the electronic apparatus 2B installed at predetermined installation positions. It is possible for the setting device 1A to perform the setting process on each of the electronic apparatus 2A and the electronic apparatus 2B before the electronic apparatus 2A and the electronic apparatus 2B are installed at the predetermined installation positions. In the image display system 6 shown in FIG. 1, the electronic apparatus 2A projects a first projection image G1 corresponding to the image data supplied from the image supply device 5 on a screen SC, and the electronic apparatus 2B projects a second projection image G2 corresponding to the image data supplied from the image supply device 5 on the screen SC. In the image display system 6 shown in FIG. 1, one of the electronic apparatus 2A and the electronic apparatus 2B becomes the master, and the other thereof becomes the slave to thereby realize the multi-projection. The multi-projection means projecting a large screen using a plurality of projectors. As shown in FIG. 1, the first projection image G1 and the second projection image G2 are projected side by side in a lateral direction so as to partially overlap each other on the screen SC, and thus, a single seamless image is formed on the screen SC as a whole. The multi-projection is realized by the two projectors in the present embodiment, but can be realized by three or more projectors, and further, it is also possible to realize vertical or horizontal and vertical matrix multi-projection. Due to the setting process on the electronic apparatus 2A and the electronic apparatus 2B by the setting device 1A, it is possible for the image supply device 5 to transmit appropriate image data and control data to the electronic apparatus 2A and the electronic apparatus 2B. Further, it is possible for the electronic apparatus 2A and the electronic apparatus 2B to receive the appropriate image data and the appropriate control data, and in FIG. 1, high quality multi-projection can be realized.

Figure 2:
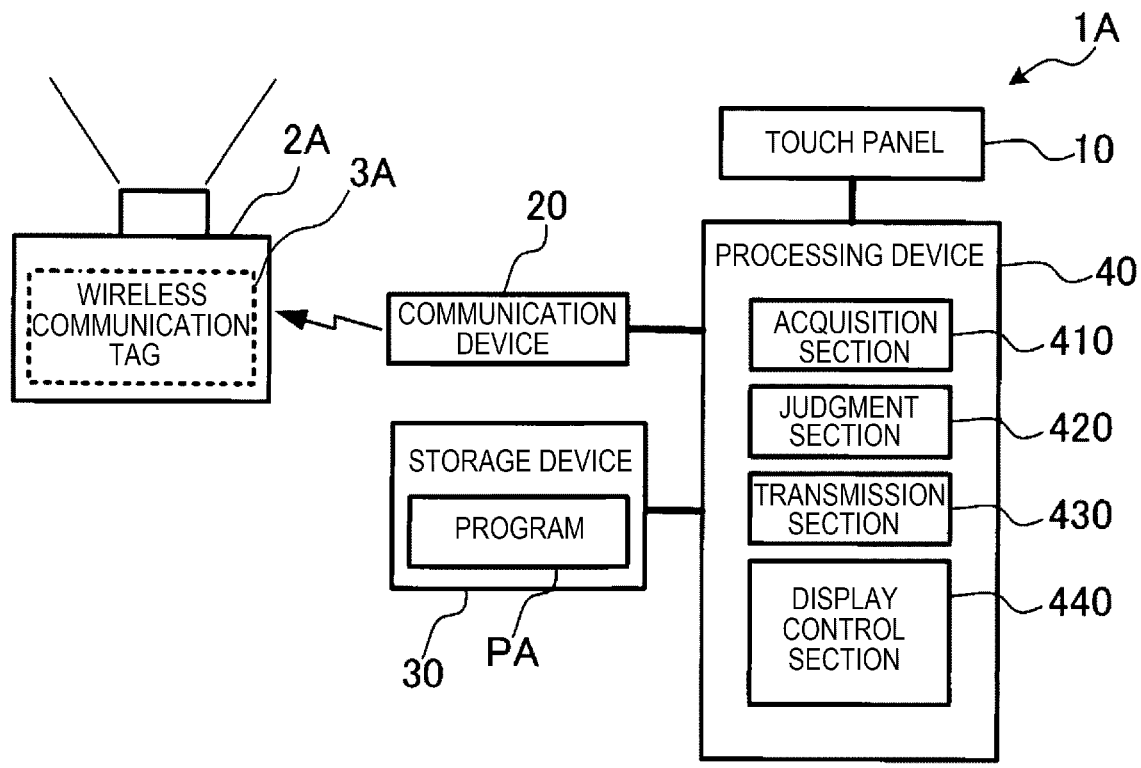
FIG. 2 is a diagram showing a configuration example of the setting device 1A and the electronic apparatus 2A.

FIG. 2 is a diagram showing a configuration example of the setting device 1A and the electronic apparatus 2A. It should be noted that the configuration of the electronic apparatus 2B is not particularly different from the configuration of the electronic apparatus 2A, and is therefore omitted from the illustration in FIG. 2. Hereinafter, what is described with respect to the electronic apparatus 2A similarly applies to the electronic apparatus 2B. When the network configuration such as an IP address configuration is appropriately performed on the electronic apparatus 2A, it becomes possible for the electronic apparatus 2A to perform the data communication such as reception of the image data from the image supply device 5 via the network 4.

In the electronic apparatus 2A, there is incorporated a wireless communication tag 3A performing wireless communication in compliance with a predetermined wireless communication standard. The wireless communication tag 3A in the present embodiment is an NFC (Near Field Communication) tag. The wireless communication tag 3A stores the configuration information representing the network configuration of the electronic apparatus 2A. As a specific example of the network configuration, there can be cited ON/OFF of a DHCP (Dynamic Host Configuration Protocol) configuration, an IP address, a subnet mask, a gateway address, and so on. The electronic apparatus 2A retrieves the configuration information from the wireless communication tag 3A taking application of power, or detection of writing of the configuration information to the wireless communication tag 3A as a trigger, and then connects itself to the network 4 in accordance with the configuration information thus retrieved. Therefore, in the present embodiment, it is possible to perform the network configuration to the electronic apparatus 2A even in the situation in which the power is not applied to the electronic apparatus 2A, or in the standby state, and therefore, there is no need to start up the electronic apparatus 2A only for the network configuration. When the electronic apparatus 2A is a projector, since the projector is provided with a light source and so on, it is effective for reducing the power consumed in the setup and maintaining the reliability of the apparatus to be able to perform the network configuration before the start up of the electronic apparatus 2A.

The configuration information to be stored in the wireless communication tag 3A is the information related to the network configuration in the present embodiment, but it is possible for the configuration information to include information necessary for the setup of the multi-projection. As a specific example of the information necessary for the setup of the multi-projection, there can be cited an initialization setting of a geometric adjustment item, a setting of an initial value of an image quality adjustment item or a predetermined value for the multi-projection, selection between a common setting and an individual setting, and soon, and these settings are made common to all of the plurality of projectors realizing the multi-projection. It should be noted that it is possible for the information to be set commonly to all of the plurality of projectors realizing the multi-projection to further include at least one of white balance, RGB values, a luminance value, color temperature, a gamma value, a blend width, a blend curve, and a black level.

Further, the configuration information of the projector to be the master out of the plurality of projectors realizing the multi-projection further includes screen layout information of the plurality of projectors, namely information representing what projector out of the plurality of projectors is in charge of the projection of the image to what part of the projection surface. Further, it is possible for the configuration information of the projector to be the master to further include identification information of the projector to be the slave as grouping information. As a specific example of the identification information, there can be cited a communication address such as an IP address or an MAC address, an individual identification name, and so on. Further, when the plurality of projectors realizing the multi-projection is divided into a plurality of groups, a group ID representing the group to which the projector belongs can be used as the grouping information described above.

In the wireless communication tag 3A, there is stored in advance certification information for certifying whether or not writing of the configuration information is allowed besides the configuration information. The certification information stored in advance in the wireless communication tag 3A is an example of first certification information in the present disclosure. The writing of the certification information to the wireless communication tag 3A can be performed before the wireless communication tag 3A comes in a factory of the electronic apparatus 2A. Further, the writing of the certification information to the wireless communication tag 3A can be performed at factory shipment of the electronic apparatus 2A, or can also be performed in accordance with an input operation to an OSD (On-Screen Display) menu to be displayed by the electronic apparatus 2A, or an input operation to an administrator's application installed in advance in the electronic apparatus 2A or the setting device 1A after the factory shipment of the electronic apparatus 2A. When the certification information has been stored in the wireless communication tag 3A at the factory shipment of the electronic apparatus 2A, it is sufficient to bundle a paper sheet or the like on which the certification information is printed with the electronic apparatus 2A. By browsing the paper sheet described above, it is possible for an operation manager of the electronic apparatus 2A to figure out the certification information having been stored in the wireless communication tag 3A. Further, when allowing the writing of the certification information with the input operation, it is preferable to allow writing only to a person having predetermined authority such as the operation manager of the electronic apparatus 2A. In this case, certification information different from the certification information described above is stored in advance in the wireless communication tag 3A for the certification of whether or not the writing of the certification information with the input operation is allowed, namely for the certification of whether or not the person has the predetermined authority, and at the same time, the paper sheet on which the certification information is printed is bundled with the electronic apparatus 2A. Further, it is sufficient to arrange to perform the certification using the certification information described above prior to input of the certification information with the input operation.

The setting device 1A is a smartphone having a wireless communication function for performing the wireless communication in compliance with the wireless communication standard described above. The setting device 1A is not limited to the smartphone. The setting device 1A can be, for example, a PC (Personal Computer) having the wireless communication function described above or a tablet terminal having the wireless communication function described above. When the setting device 1A is held over a place where the wireless communication tag 3A is incorporated in the electronic apparatus 2A, the setting device 1A communicates wirelessly with the wireless communication tag 3A using the wireless communication function to obtain the certification information described above. Then, the setting device 1A prompts a user of the electronic apparatus 2A such as the operation manager thereof to input the certification information, and then matches the certification information thus input and the certification information obtained from the wireless communication tag 3A with each other to perform the certification. Then, when the setting device 1A has succeeded in certification, the setting device 1A transmits the configuration information input from the user to the wireless communication tag 3A using the wireless communication function to make the wireless communication tag 3A store the configuration information. In the present embodiment, since the certification is performed in such a manner, it is avoided that the network configuration of the electronic apparatus 2A is made by an unauthorized person other than the user described above. In the present embodiment, since it is necessary to hold the setting device 1A over the place where the wireless communication tag 3A is incorporated in the electronic apparatus 2A when performing the network configuration of the electronic apparatus 2A using the setting device 1A, it is preferable to provide a logo of NFC, a character, a picture, or the like at that place as a mark used when holding over the setting device 1A.

As shown in FIG. 2, the setting device 1A includes a touch panel 10, a communication device 20, a storage device 30, and a processing device 40. The touch panel 10 is a device obtained by integrating a display device for displaying an image and an input device to which information is input by a user with each other. The touch panel 10 makes the display device display a variety of images. As an example of the image which the touch panel 10 makes the display device display, there can be cited an image of an UI (User Interface) screen which prompts the user to make the network configuration of the electronic apparatus 2A. The touch panel 10 detects a touch position with an input device using a capacitance determined by an object making contact with the touch panel 10 and the touch panel 10, and then outputs data representing the touch position thus detected to the processing device 40. Thus, the operation content of the user to the touch panel 10 is transmitted to the processing device 40. For example, in a circumstance in which the display device is made to display the UI screen, the operation content of the user to the UI screen is transmitted to the processing device 40.

The communication device 20 is a reader/writer device for NFC. The communication device 20 communicates wirelessly with the wireless communication tag 3A under the control by the processing device 40. The communication device 20 transmits a predetermined radio wave under the control by the processing device 40. When a distance between the communication device 20 and the wireless communication tag 3A is equal to or shorter than a predetermined threshold value, the wireless communication tag 3A sends back the certification information to the communication device 20 using the power induced by the radio-wave described above as the operating power. The communication device 20 receives the certification information transmitted from the wireless communication tag 3A, and then delivers the certification information thus received to the processing device 40. Further, the communication device 20 transmits the configuration information delivered from the processing device 40 to the wireless communication tag 3A. Although the detailed illustration is omitted in FIG. 2, the setting device 1A includes a second communication device for performing communication via a mobile packet communication network or a mobile telephone network besides the communication device 20.

The storage device 30 is a recording medium which can be read by the processing device 40. The storage device 30 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory).

In the nonvolatile memory in the storage device 30, there is stored a program PA to be executed by the processing device 40. The volatile memory in storage device 30 is used by the processing device 40 as a work area when executing the program PA. The program PA can be referred to as an "application program," "application software," or an "app." The program PA is obtained from, for example, a server not shown via the second communication device, and is then stored in the storage device 30. The program PA can be stored in advance in the storage device 30.

The processing device 40 is configured including a processor such as a CPU (Central Processing Unit). The processing device 40 can be formed of a single processor, or can also be formed of a plurality of processors. The processing device 40 retrieves the program PA from the nonvolatile memory to the volatile memory taking the fact that the operation instructing the start of the execution of the program PA is made on the touch panel 10 as a trigger, and then starts the execution of the program PA. It should be noted that it is also possible to make the processing device 40 start the execution of the program PA taking the detection of the fact that the setting device 1A is held over the place where the wireless communication tag 3A is incorporated in the electronic apparatus 2A and the distance between the wireless communication tag 3A and the communication device 20 becomes equal to or shorter than a predetermined threshold value, specifically the detection of the reception of the certification information by the communication device 20, as a trigger.

The processing device 40 which is operating in accordance with the program PA functions as an acquisition section 410, a judgment section 420, a transmission section 430, and a display control section 440. The acquisition section 410, the judgment section 420, the transmission section 430, and the display control section 440 shown in FIG. 2 are each a software module realized by operating the processing device 40 in accordance with the program PA.

The acquisition section 410 obtains the certification information received by the communication device 20 from the communication device 20. The judgment section 420 judges whether or not the certification information obtained by the acquisition section 410 and the certification information input by the user with an operation to the touch panel 10 match each other. The certification information input by the user is an example of second certification information in the present disclosure. When the judgment section 420 judges that the certification information obtained by the acquisition section 410 and the certification information input to the touch panel 10 match each other, the transmission section 430 transmits the configuration information input by the user with the operation to the touch panel 10 as the information representing the network configuration to the electronic apparatus 2A to the transmission source of the certification information described above to make the transmission source store the configuration information. The display control section 440 makes the display device of the touch panel 10 display a variety of messages. Specifically, when the display control section 440 transmits the configuration information to the wireless communication tag 3A to make the wireless communication tag 3A store the configuration information, the display control section 440 makes the display device display a message representing completion of the network configuration. In contrast, when the judgment section 420 has judged that the certification information does not match, and the transmission of the configuration information to the wireless communication tag 3A is not performed, the display control section 440 makes the display device display a message representing the mismatch in the certification information.

Figure 3:
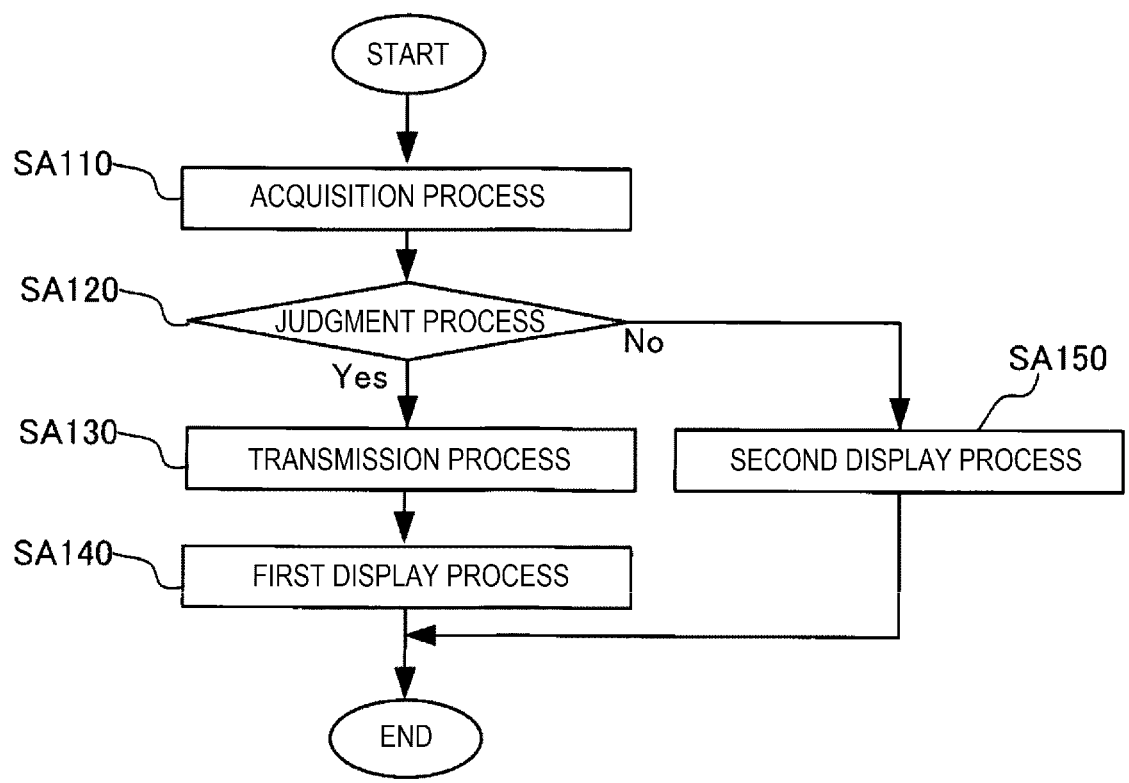
FIG. 3 is a flowchart showing a flow of a control method to be executed by a processing device 40 of the setting device 1A in accordance with a program PA stored in a storage device 30.

Further, the processing device 40 operating in accordance with the program PA performs the control method according to the present embodiment taking the detection of the fact that the operation instructing the execution of the network configuration has been made to the touch panel 10 as a trigger. As a specific example of the operation of instructing the execution of the network configuration, there can be cited an operation of selecting "network configuration with NFC" from a list in a menu which the processing device 40 makes the display device display in accordance with the program PA. FIG. 3 is a flowchart showing a flow of a control method to be executed by the processing device 40 in accordance with the program PA. As shown in FIG. 3, the control method according to the present embodiment includes an acquisition process SA110, a judgment process SA120, a transmission process SA130, a first display process SA140, and a second display process SA150.

In the acquisition process SA110, the processing device 40 functions as the acquisition section 410. In the acquisition process SA110, the processing device 40 obtains the certification information received by the communication device 20 from the communication device 20. In the judgment process SA120, the processing device 40 functions as the judgment section 420. In the judgment process SA120, the processing device 40 judges whether or not the certification information obtained in the acquisition process SA110 and the certification information input by the operation to the touch panel 10 much each other.

When the judgment result in the judgment process SA120 is "Yes," in other words, when the certification information obtained in the acquisition process SA110 and the certification information input to the touch panel 10 match each other, the processing device 40 executes the transmission process SA130 and the first display process SA140, and then ends the present control method. In contrast, when the judgment result in the judgment process SA120 is "No," in other words, when the certification information obtained in the acquisition process SA110 and the certification information input to the touch panel 10 fail to match each other, the processing device 40 executes the second display process SA150, and then ends the present control method.

In the transmission process SA130, the processing device 40 functions as the transmission section 430. In the transmission process SA130, the processing device 40 transmits the configuration information input by, for example, the user to the wireless communication tag 3A with the communication device 20 as the information representing the network configuration to the electronic apparatus 2A to make the wireless communication tag 3A store the configuration information.

In the first display process SA140 and the second display process SA150, the processing device 40 functions as the display control section 440. In the first display process SA140, the processing device 40 makes the display device display the message representing the completion of the network configuration. In contrast, in the second display process SA150, the processing device 40 makes the display device display the message representing the mismatch in the certification information.

As described hereinabove, according to the setting device 1A according to the present embodiment, prior to the transmission of the configuration information to the electronic apparatus 2A, the certification of an input person of the configuration information is performed using the certification information stored in the wireless communication tag 3A incorporated in the electronic apparatus 2A. According to the present embodiment, since it is avoided that the network configuration of the electronic apparatus 2A is performed by a person who does not know the certification information, by notifying only the person having the authority such as the operation manager of the electronic apparatus 2A of the certification information described above, it becomes possible to make only the person having the authority easily perform the network configuration of the electronic apparatus 2A with the wireless communication. When performing the network configuration with respect to the electronic apparatus 2B, it is sufficient to perform the control method shown in FIG. 3 once again targeting at the electronic apparatus 2B. In other words, when the image display system 6 includes the N projectors, it is sufficient to repeatedly perform the control method shown in FIG. 3 N times targeting at the N projectors, respectively. It should be noted that N is an integer equal to or greater than 2.

2. Second Embodiment

Figure 4:
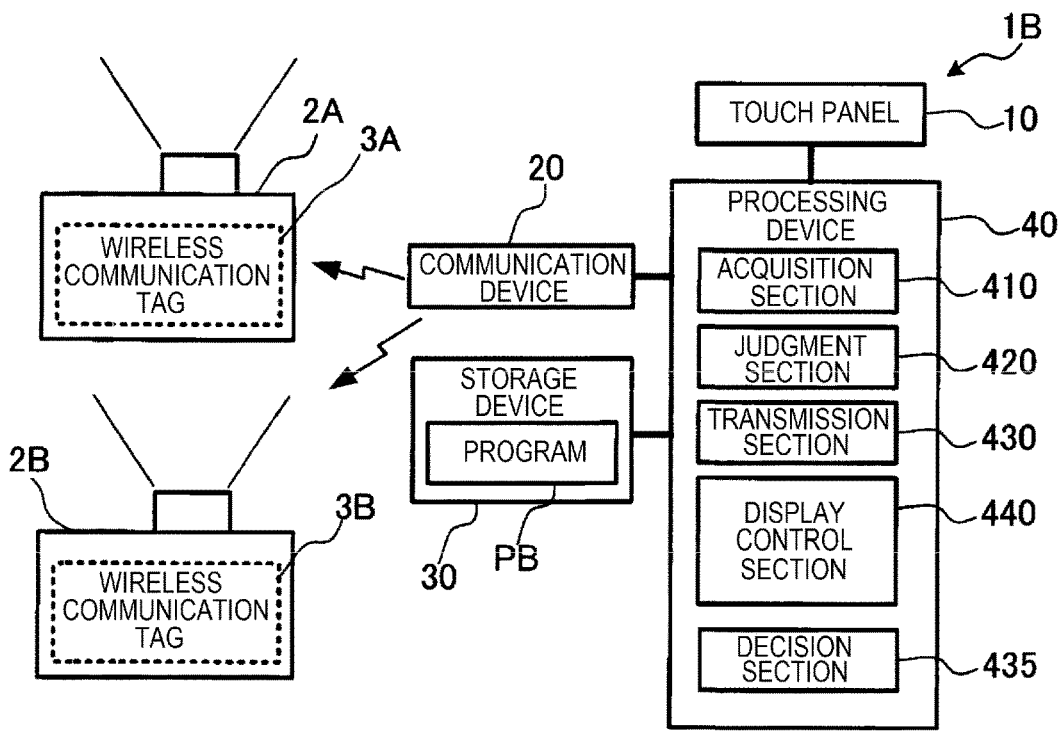
FIG. 4 is a diagram showing a configuration example of a setting device 1B according to a second embodiment of the present disclosure, and the electronic apparatus 2A and the electronic apparatus 2B on which a network configuration is performed by the setting device 1B.

FIG. 4 is a diagram showing a setting device 1B according to a second embodiment of the present disclosure, and the electronic apparatus 2A and the electronic apparatus 2B on which the network configuration is performed using the setting device 1B.

In the electronic apparatus 2A, there is incorporated a wireless communication tag 3A similarly to the first embodiment. The electronic apparatus 2A and the wireless communication tag 3A are the same as those in the first embodiment, and therefore, the detailed description thereof will be omitted. In the electronic apparatus 2B, there is incorporated a wireless communication tag 3B which performs wireless communication in compliance with the same wireless communication standard as in the wireless communication tag 3A. The wireless communication tag 3B stores the configuration information representing the network configuration of the electronic apparatus 2B. The electronic apparatus 2B retrieves the configuration information from the wireless communication tag 3B taking application of power or detection of writing of the configuration information to the wireless communication tag 3B as a trigger, and then connects itself to the network 4 in accordance with the configuration information thus retrieved. Therefore, it is possible to perform the network configuration to the electronic apparatus 2B even in the situation in which the power is not applied to the electronic apparatus 2B, or in the standby state, and therefore, there is no need to startup the electronic apparatus 2B only for the network configuration. The electronic apparatus 2A is an example of a first electronic apparatus in the present disclosure, and the electronic apparatus 2B is an example of a second electronic apparatus in the present disclosure.

The wireless communication tag 3A is an example of a first wireless communication tag in the present disclosure, and the wireless communication tag 3B is an example of a second wireless communication tag in the present disclosure. The configuration information stored in the wireless communication tag 3A is an example of first configuration information representing a first configuration for connecting the electronic apparatus 2A to the network 4. The configuration information stored in the wireless communication tag 3B is an example of second configuration information representing a second configuration for connecting the electronic apparatus 2B to the network 4. Although the details will be described later, the first configuration and the second configuration in the present embodiment are each a fixed network configuration, and each include a fixed communication address. This is because since in the multi-projection system, it is necessary to make each of the projectors perform stable communication, it is preferable to set a fixed address to each of the projectors realizing the multi-projection.

In the wireless communication tag 3B, there is stored in advance the certification information for certifying whether or not writing of the configuration information is allowed similarly to the wireless communication tag 3A. The writing of the certification information to the wireless communication tag 3B can also be performed at the factory shipment of the electronic apparatus 2B, or can also be performed by the input operation to the OSD menu of the operation manager of the electronic apparatus 2B after the factory shipment of the electronic apparatus 2B. The certification information stored in advance in the wireless communication tag 3A is an example of first certification information in the present disclosure, and the certification information stored in advance in the wireless communication tag 3B is an example of third certification information in the present disclosure. In the present embodiment, the certification information to be stored in the wireless communication tag 3B and the certification information to be stored in the wireless communication tag 3A are the same. In other words, in the present embodiment, the third certification information is the same as the first certification information.

The setting device 1B according to the present embodiment is a smartphone having a wireless communication function of performing the wireless communication in compliance with the wireless communication standard described above similarly to the setting device 1A, but can also be a PC having the wireless communication function described above, or a tablet terminal having the wireless communication function described above. The setting device 1B performs the wireless communication with the wireless communication tag 3A or the wireless communication tag 3B with the wireless communication function described above to write the configuration information. The configuration information stored in the wireless communication tag 3A or the wireless communication tag 3B is used when certifying whether to allow the writing of the configuration information by the setting device 1B. Since such a certification is performed, it is avoided that the network configuration of the electronic apparatus 2A and the electronic apparatus 2B is performed by an unauthorized person.

The setting device 1B is the same in hardware configuration as the setting device 1A, and includes the touch panel 10, the communication device 20, the storage device 30, and the processing device 40. It should be noted that in the storage device 30 of the setting device 1B, there is stored a program PB instead of the program PA. The processing device 40 which is operating in accordance with the program PB functions as the acquisition section 410, the judgment section 420, the transmission section 430, a decision section 435, and the display control section 440. The acquisition section 410, the judgment section 420, the transmission section 430, the decision section 435, and the display control section 440 shown in FIG. 4 are each a software module. Since functions of the acquisition section 410, the judgment section 420, the transmission section 430, and the display control section 440 are the same as those in the first embodiment, the detailed description thereof will be omitted.

The decision section 435 changes a part of the first configuration information to thereby decide the second configuration information. For example, when an IP address is included in the configuration information as the communication address, the decision section 435 counts up or increments a number of a host part in the IP address in the first configuration information to thereby decide the IP address of the second configuration information. By setting the IP address included in the first configuration information as a fixed IP address, the IP address included in the second configuration information also becomes a fixed IP address.

Figure 5:
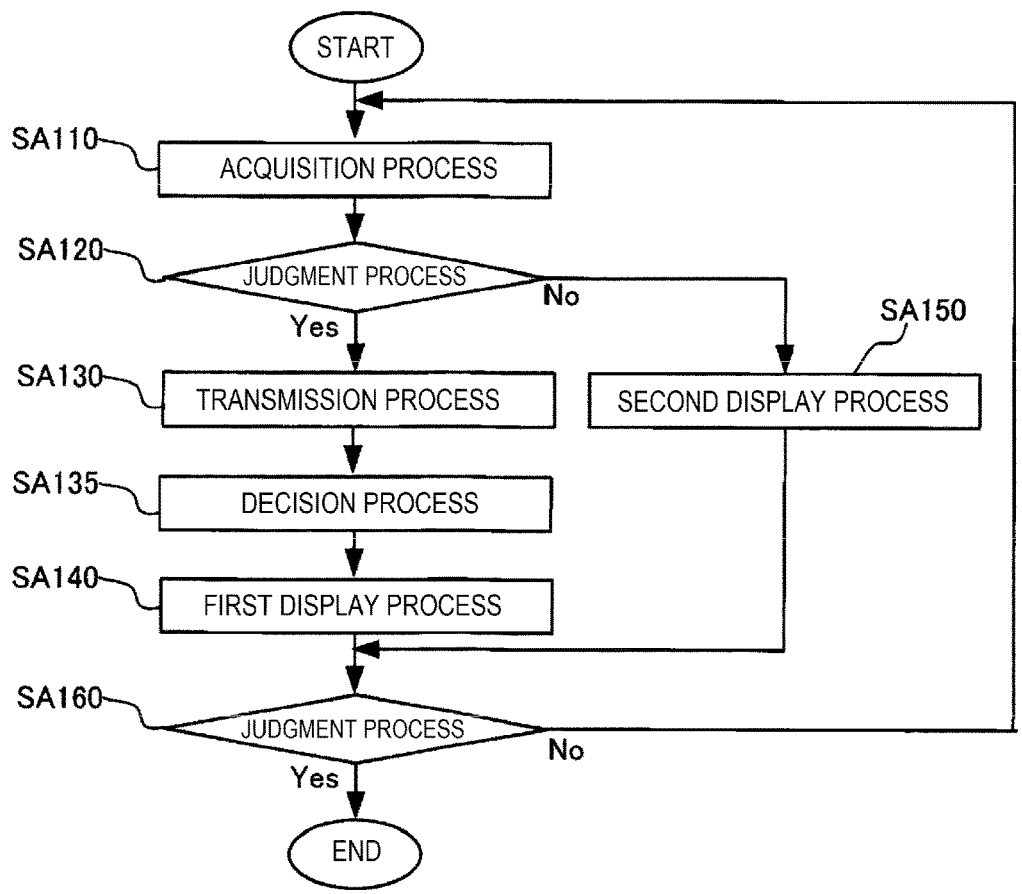
FIG. 5 is a flowchart showing a flow of a control method to be executed by the processing device 40 of the setting device 1B in accordance with a program PB stored in the storage device 30.

Further, the processing device 40 which is operating in accordance with the program PB executes a control method according to the present embodiment. FIG. 5 is a flowchart showing a flow of the control method to be executed by the processing device 40 in accordance with the control program PB. The control method according to the present embodiment will hereinafter be described citing when the network configuration of the electronic apparatus 2A is performed, and then the network configuration of the electronic apparatus 2B is performed as an example.

When the user holds the setting device 1B over the place where the wireless communication tag 3A is incorporated in the electronic apparatus 2A, the processing device 40 executes the acquisition process SA110 and the judgment process SA120 similarly to the first embodiment. When the judgment result in the judgment process SA120 is "Yes," the processing device 40 executes the transmission process SA130, a decision process SA135, the first display process SA140, and a judgment process SA160. The processing content of the transmission process SA130 and the first display process SA140 is the same as in the first embodiment, and therefore, the detailed description thereof will be omitted. The transmission process SA130 to be executed with respect to the electronic apparatus 2A is an example of a first transmission process in the present disclosure.

In the decision process SA135, the processing device 40 functions as the decision section 435. In the decision process SA135, the processing device 40 changes a part of the first configuration information to thereby decide the second configuration information. In the judgment process SA160, the processing device 40 refers to the user about whether or not the network configuration has been completed with respect to all of the electronic apparatuses to be the targets of the network configuration, and then judges whether or not the operation representing the completion has been made to the touch panel 10. When the judgment result in the judgment process SA160 is "Yes," the processing device 40 ends the execution of the present control method. In contrast, when the judgment result in the judgment process SA160 is "No," the processing device 40 executes the processing in the acquisition process SA110 and the subsequent processes once again. In the present embodiment, since the network configuration of the electronic apparatus 2B is not made at the time point when the network configuration of the electronic apparatus 2A is completed, the user performs the operation representing noncompletion to the touch panel 10, and then holds the setting device 1B over the place where the wireless communication tag 3B is incorporated in the electronic apparatus 2B. Since the judgment result in the judgment process SA160 becomes "No," the processing in the acquisition process SA110 and the subsequent processes is executed once again.

As described above, in the present embodiment, the third certification information is the same as the first certification information. Therefore, in the judgment process SA120, it is not necessary for the user to input the certification information again, and the judgment result in the judgment process SA120 with respect to the electronic apparatus 2B automatically becomes "Yes," and the transmission process SA130, the decision process SA135, the first display process SA140, and the judgment process SA160 are executed. In other words, in the present embodiment, after transmitting the configuration information to the electronic apparatus 2A, the transmission of the configuration information to the second electronic apparatus is automatically performed taking the detection of the electronic apparatus 2B as a trigger. The transmission process SA130 to be executed with respect to the electronic apparatus 2B is an example of a second transmission process in the present disclosure. In the transmission process SA130 with respect to the electronic apparatus 2B, the processing device 40 transmits the second configuration information which has been decided by changing a part of the first configuration information to the wireless communication tag 3B, and then makes the wireless communication tag 3B store the second configuration information.

Since there is no electronic apparatus in which the network configuration has not been completed at the moment when the network configuration of the electronic apparatus 2B is completed, the user performs the operation representing the completion to the touch panel 10. The judgment result in the judgment process SA160 becomes "Yes," and the execution of the present control method ends.

As described hereinabove, in the present embodiment, since the fixed IP address as the configuration information representing the network configuration to the electronic apparatus 2B is automatically generated in the second configuration information, and it is not necessary to input the certification information again, it becomes possible to easily set the fixed configuration information to the electronic apparatus 2A and the electronic apparatus 2B.

In the present embodiment, the certification information is stored in each of the wireless communication tag 3A and the wireless communication tag 3B. However, it is possible to store apparatus-intrinsic information of the electronic apparatus 2A in the wireless communication tag 3A besides the certification information, and then make the wireless communication tag 3A execute the processing of transmitting the apparatus-intrinsic information to the setting device 1B together with the certification information. It should be noted that as a specific example of the apparatus-intrinsic information, there can be cited information representing the model of the electronic apparatus 2A such as a character string representing the model number of the electronic apparatus 2A, the configuration information which can be set with the OSD menu of the electronic apparatus 2A, and information with which an error log or a processing history of the electronic apparatus 2A can be traced. Similarly, it is possible to store apparatus-intrinsic information of the electronic apparatus 2B in the wireless communication tag 3B, and then make the wireless communication tag 3B execute the processing of transmitting the apparatus-intrinsic information to the setting device 1B together with the certification information. Further, it is possible to make the processing device 40 of the setting device 1B execute the processing of judging whether or not the projector as the transmission source of the certification information is compatible with the multi-projection from the apparatus-intrinsic information received together with the certification information, and then making the display device of the touch panel 10 display the message corresponding to the judgment result.

In the present embodiment, the second configuration information is decided by changing a part of the first configuration information. However, it is possible to arrange that a list file in which the first configuration information and the second configuration information are registered in advance is stored in the storage device 30 in advance, and then the network configuration of the electronic apparatus 2A and the electronic apparatus 2B is performed using the configuration information retrieved in sequence from the list file. Further, it is possible to make the user sequentially input the first configuration information and the second configuration information. This is because according also to such an aspect, it is possible to omit start-up of the OSD menu and the input of the certification information in each of the electronic apparatus 2A and the electronic apparatus 2B, and accordingly, the time and effort are reduced. In the aspect of making the user sequentially input the first configuration information and the second configuration information, it is possible to adopt a configuration in which the list file having the first configuration information and the second configuration information input by the user arranged in the order of inputting is stored in the storage device 30, and the network configuration of the electronic apparatus 2A and the electronic apparatus 2B can be performed once again using the list file.

Further, although in the present embodiment, the first certification information and the third certification information are the same, it is possible to adopt a configuration in which the execution of the judgment process SA120 is omitted until the judgment result in the judgment process SA160 becomes "Yes" when it is determined that the first certification information and the certification information input by the user match each other, or adopt a configuration in which the processing in the transmission process SA130 and the subsequent processes is executed irrespective of the judgment result in the judgment process SA120. This is because according also to this aspect, the time and effort required to sequentially input the certification information can be reduced. It should be noted that when giving priority to easily setting the fixed configuration information to the electronic apparatus 2A and the electronic apparatus 2B over avoiding that the network configuration is made by an unauthorized person, it is possible to omit the judgment process SA120 and the second display process SA150 from the control method shown in FIG. 5. In other words, it is sufficient for the first transmission process in the present disclosure to be processing of transmitting the first configuration information representing the fixed first configuration for connecting the first electronic apparatus to the network 4 to the first electronic apparatus taking the detection of the first electronic apparatus as a trigger. Further, it is sufficient for the second transmission process in the present disclosure to be processing of transmitting the second configuration information representing the fixed second configuration different from the first configuration and configured to connect the second electronic apparatus to the network 4 to the second electronic apparatus taking the detection of the second electronic apparatus as a trigger after transmitting the first configuration information.

3. Modified Examples

It is possible to arbitrarily combine any of the following modifications with each of the embodiments described above.

(1) Although the wireless communication tag 3A is incorporated in the electronic apparatus 2A, but the wireless communication tag 3A can be attached to the outside of a chassis of the electronic apparatus 2A. The same applies to the wireless communication tag 3B. In essence, it is sufficient that the wireless communication tag which has already stored the certification information to be used in the certification when performing setting for connecting the electronic apparatus to the network, which transmits the certification information, and which stores the configuration information received is provided to the electronic apparatus to be a target of the network configuration. Further, the wireless communication tag 3A and the wireless communication tag 3B are not limited to the NFC tag, but can be a wireless communication tag for performing the wireless communication compliant with another near field communication standard.

(2) It is possible to make the processing device 40 execute processing of making the wireless communication tag 3A store default configuration information representing a factory default network configuration, and then retrieving the default configuration information taking the fact that an operation instructing the initialization of the network configuration is performed on the setting device 1A or the setting device 1B as a trigger, and then writing the default configuration information thus retrieved in the wireless communication tag 3A as new configuration information. The same applies to the wireless communication tag 3B.

(3) In each of the embodiments described above, there is described the application example of the present disclosure to the network configuration of the projector. However, the control method according to the present disclosure can be applied to any electronic apparatuses which can be connected to a network such as a printer, a home-use game machine, or a television receiver. Specifically, it is sufficient to provide the electronic apparatus to be a target of the network configuration with the wireless communication tag 3A or the wireless communication tag 3B, and make the processing device of the electronic apparatus execute the processing of retrieving the configuration information from the wireless communication tag taking the application of power to the electronic apparatus or the detection of the writing of the configuration information to the wireless communication tag as a trigger, and then connecting itself to the network in accordance with the configuration information thus retrieved.

(4) In the first embodiment described above, the program PA has already been stored in the storage device 30. However, it is possible to manufacture or distribute the program PA alone. As a specific method of distributing the program PA, there can be cited an aspect of writing the program PA described above in a computer-readable recording medium such as a flash ROM (Read Only Memory) to distribute the recording medium, and an aspect of distributing the program PA by downloading the program PA through a telecommunication line such as the Internet. By installing the program PA in a general information processing device such as a PC, and then operating a computer in the information processing device in accordance with the program PA, it becomes possible to make the information processing device function as the setting device 1A according to the first embodiment. It is also possible to similarly manufacture or distribute the program PB according to the second embodiment alone.

(5) The acquisition section 410, the judgment section 420, the transmission section 430, and the display control section 440 in the first embodiment are the software modules, but some or all of the acquisition section 410, the judgment section 420, the transmission section 430, and the display control section 440 can be hardware. As an example of the hardware, there can be cited a DSP (Digital Signal Processor), an ASIC (Application Specific Integrated Circuit), a PLD (Programmable Logic Device), and an FPGA (Field Programmable Gate Array). Even when some or all of the acquisition section 410, the judgment section 420, the transmission section 430, and the display control section 440 are hardware, the same advantages as those of the embodiments described above are exerted. Similarly, the decision section 435 can also be hardware.

(6) The setting device 1A is the smartphone having the near field communication function, but it is possible to provide the acquisition section 410, the judgment section 420, the transmission section 430, and the display control section 440 to a server device communicating with the smartphone having the near field communication function via a LAN or the Internet to thereby make the server device function as the setting device 1A. In this case, the smartphone described above which communicates with the server device functions as a UI device for providing the user with a UI for inputting the certification information, and a relay device for relaying the communication between the wireless communication tag 3A and the server device described above. Similarly, it is possible to provide the acquisition section 410, the judgment section 420, the transmission section 430, the decision section 435, and the display control section 440 to a server device communicating with the smartphone having the near field communication function via a LAN or the Internet to thereby make the server device function as the setting device 1B.

(7) In the image display system 6 shown in FIG. 1, there is adopted the configuration in which the image supply device 5 supplies the image data and the control data, but it is possible to adopt a configuration separately provided with a device for supplying the image data and a device for supplying the control data. The control data includes data for controlling the projector such as data for an image quality adjustment, data for geometric adjustment of an image, and data for a power adjustment in the projector. Further, the image data includes content to be displayed by the projector. It is possible for the image supply device 5, or the device for supplying the image data and the device for supplying the control data to perform, for example, a necessary adjustment for the multi-projection or mapping of images on the content described above, and then transmit the result to the projector. Further, it is also possible for the image supply device 5, or the device for supplying the image data and the device for supplying the control data to perform the processing of the image data and the control data in cooperation with the projector. Further, it is possible to adopt a configuration in which the projector or the image display system 6 is provided with a storage device in which the content described above is stored, and it is possible to remove the image supply device 5 or the like from the image display system 6 when the content is stored in the storage device.

4. Aspects Understood from at Least One of Embodiments and Modified Examples The present disclosure is not limited to the embodiments and the modified examples described above, but can be implemented in a variety of aspects within the scope or the spirit of the present disclosure. For example, the present disclosure can also be implemented in the following aspects. The technical features in each of the embodiments described above corresponding to the technical features in each of the aspects described below can arbitrarily be replaced or combined in order to solve a part or the whole of the problem of the present disclosure, or to achieve some or all of the advantages of the present disclosure. Further, the technical feature can arbitrarily be eliminated unless described in the present specification as an essential element.

The electronic apparatus according to the present disclosure is provided with a wireless communication tag described below. In the wireless communication tag, there is stored first certification information used for certification when performing a configuration used to connect itself to a network so as to be able to be read by a setting device for performing the configuration. When it is determined that second certification information input by a user to the setting device and the first certification information match each other, the wireless communication tag receives configuration information input by the user as information representing the configuration, and then stores the configuration information. According to the present aspect, since the matching between the first certification information stored in the wireless communication tag and the second certification information input by the user is performed before writing the configuration information to the wireless communication tag, it becomes possible only for an authorized person to easily perform the network configuration of the electronic apparatus using wireless communication.

In the aspect of the electronic apparatus described above, the first certification information may be stored in the wireless communication tag at factory shipment of the electronic apparatus, and the first certification information stored in the wireless communication tag may be rewritable with an operation to the electronic apparatus. According to the former aspect, the time and effort required for the operation manager or the like of the electronic apparatus to store the first certification information blow by blow in the wireless communication tag are reduced, and according to the latter aspect, it becomes possible to flexibly set the first certification information in accordance with the request of the operation manager or the like of the electronic apparatus.

In the aspect of the electronic apparatus described above, the electronic apparatus may be connected to the network in accordance with the configuration information stored in the wireless communication tag taking application of power or detection of writing of the configuration information to the wireless communication tag as a trigger. According to the former aspect, it becomes possible to perform the network configuration of the electronic apparatus in the situation in which the power is not applied to the electronic apparatus, and according to the latter aspect, it becomes possible to perform the network configuration of the electronic apparatus while the electronic apparatus is in use.

In the aspect of the electronic apparatus described above, the wireless communication tag may be an NFC tag. According to the present aspect, it becomes possible to perform the network configuration of the electronic apparatus using the NFC tag.

In the aspect of the electronic apparatus described above, the electronic apparatus may project an image based on image data received via the network connected in accordance with the configuration information. According to the present aspect, it becomes possible only for an authorized person to easily perform the network configuration of the electronic apparatus which projects the image based on the image data received via the network.

An aspect of a setting device according to the present disclosure includes a communication device, an input device, and a processing device described below. The communication device communicates first certification information to be used for certification when performing a configuration used to connect an electronic apparatus to a network with a wireless communication tag provided to the electronic apparatus. To the input device, there is input second certification information in accordance with an operation by a user. The processing device controls the communication device and the input device. The processing device has an acquisition section, a judgment section, and a transmission section described below. The acquisition section obtains the first certification information which is transmitted from the wireless communication tag, and which is received by the communication device. The judgment section judges whether or not the first certification information obtained and the second certification information input to the input device match each other. The transmission section transmits configuration information input to the input device as information representing the configuration to the wireless communication tag to make the wireless communication tag store the configuration information when it is judged by the judgment section that the first certification information and the second certification information match each other. According also to the present aspect, since the certification using the first certification information stored in the wireless communication tag is performed before writing the configuration information to the wireless communication tag, it becomes possible only for an authorized person to easily perform the network configuration of the electronic apparatus using wireless communication.

The method of controlling a setting device according to the present disclosure is a method of controlling a setting device which is provided with a communication device, and which performs a configuration used to connect an electronic apparatus to a network, and includes an acquisition process, a judgment process, and a transmission process described below. The acquisition process is processing of obtaining first certification information to be used for certification when performing the configuration from a wireless communication tag provided to the electronic apparatus with the communication device. The judgment process is processing of judging whether or not second certification information input by a user and the first certification information obtained match each other. The transmission process is processing of transmitting configuration information input by the user as information representing the configuration to the wireless communication tag with the communication device to make the wireless communication tag store the configuration information when it is judged that the second certification information and the first certification information match each other. According also to the present aspect, since the certification using the first certification information stored in the wireless communication tag is performed before writing the configuration information to the wireless communication tag, it becomes possible only for an authorized person to easily perform the network configuration of the electronic apparatus using wireless communication.

An aspect of a non-transitory computer-readable storage medium storing a program according to the present disclosure makes a computer such as a CPU execute an acquisition process, a judgment process, and a transmission process described below. In the acquisition process, the computer obtains first certification information to be used for certification when performing a configuration used to connect an electronic apparatus to a network from a wireless communication tag provided to the electronic apparatus. In the judgment process, the computer judges whether or not the first certification information obtained and second certification information input by a user to the computer match each other. In the transmission process, the computer transmits configuration information input to the computer as information representing the configuration to the wireless communication tag to make the wireless communication tag store the configuration information when it is judged in the judgment process that the first certification information and the second certification information match each other. According also to the present aspect, since the certification using the first certification information stored in the wireless communication tag is performed before writing the configuration information to the wireless communication tag, it becomes possible only for an authorized person to easily perform the network configuration of the electronic apparatus using wireless communication.

What is claimed is:

1. An electronic apparatus comprising:
   a wireless communication tag (i) in which first certification information, which is to be used for certification when performing a configuration used to be connected to a network, is stored so as to be read by a setting device configured to perform the configuration, and (ii) which receives and stores configuration information input by a user as information representing the configuration when it is judged, by the setting device, that second certification information input by the user to the setting device and the first certification information match each other.

2. The electronic apparatus according to claim 1, wherein the first certification information is stored in the wireless communication tag at factory shipment of the electronic apparatus.

3. The electronic apparatus according to claim 1, wherein the first certification information stored in the wireless communication tag is rewritable with an operation to the electronic apparatus.

4. The electronic apparatus according to claim 1, wherein the electronic apparatus is connected to the network in accordance with the configuration information stored in the wireless communication tag taking application of power or detection of writing of the configuration information to the wireless communication tag as a trigger.

5. The electronic apparatus according to claim 1, wherein the wireless communication tag is an NFC tag.

6. The electronic apparatus according to claim 4, wherein the electronic apparatus is a projector, and the electronic apparatus projects an image based on image data received via the network connected in accordance with the configuration information.

7. A method of controlling a setting device provided with a communication device and configured to perform a configuration used to connect an electronic apparatus to a network, the method comprising:
   obtaining, with the communication device and by way of near field communication with a wireless communication tag provided to the electronic apparatus, first certification information to be used for certification when performing the configuration;
   judging, with the setting device, whether or not (i) second certification information input by a user into an input device of the setting device and (ii) the first certification information obtained match each other; and
   when it is judged that the second certification information and the first certification information match each other, transmitting, with the communication device and to the wireless communication tag by way of the near field communication, configuration information input by the user as information representing the configuration to make the wireless communication tag store the configuration information.

8. A non-transitory computer-readable storage medium storing a program making a computer execute processing comprising:
   an acquisition process of obtaining, from a wireless communication tag provided to an electronic apparatus, first certification information to be used for certification when performing a configuration used to connect the electronic apparatus to a network;
   a judgment process of judging whether or not (i) the first certification information obtained and (ii) second certification information input by a user to the computer match each other; and
   a transmission process of, when it is judged in the judgment process that the first certification information and the second certification information match each other, transmitting, to the wireless communication tag, configuration information input to the computer as information representing the configuration to make the wireless communication tag store the configuration information, wherein the non-transitory computer-readable storage medium is included within a setting device.

\* \* \* \* \*